United States Patent [19]

Stein

[11] 3,762,684
[45] Oct. 2, 1973

[54] ROTATABLE PIPE COUPLING
[75] Inventor: William H. Stein, Sun Valley, Calif.
[73] Assignee: Anonda Plastics, Inc., Pacoima, Calif.
[22] Filed: Apr. 26, 1971
[21] Appl. No.: 137,470

[52] U.S. Cl. ............... 251/148, 138/89, 285/31, 285/151, 285/156, 285/184. 285/363, 285/DIG. 2, 285/DIG. 22
[51] Int. Cl. .................... F16l 27/00, F16k 51/00
[58] Field of Search .............. 285/31, 32, 151, 285/152, 414, 415, DIG. 22, 184, DIG. 2, 156, 423, 363; 251/148; 138/89

[56] References Cited
UNITED STATES PATENTS

| 2,889,089 | 6/1959 | Herrick et al. | 285/DIG. 22 |
| 3,119,411 | 1/1964 | Bock et al. | 285/156 |
| 1,300,380 | 4/1919 | Griffin | 285/156 X |
| 2,650,259 | 8/1953 | Marks | 285/414 X |
| 2,026,674 | 1/1936 | Edwards | 285/415 X |
| 1,043,683 | 11/1912 | Fieser | 285/DIG. 22 |
| 1,053,528 | 2/1913 | Mueller et al. | 285/31 |
| 1,186,325 | 6/1916 | Metzger | 285/415 X |

FOREIGN PATENTS OR APPLICATIONS

| 614,513 | 2/1961 | Canada | 285/156 |
| 464,623 | 12/1968 | Switzerland | 285/DIG. 22 |
| 586,881 | 12/1958 | Italy | 285/156 |

Primary Examiner—Thomas F. Callaghan
Attorney—Larry N. Barger

[57] ABSTRACT

A plastic "tee" coupling for toilet and sink systems of mobile homes and the like. The coupling has a main tube with an integral flange and side tube. The coupling also has plastic platic collar that snaps on over the flange and is permanently retained between the flange and side tube. The plastic collar has sufficient "give" to springedly hold a rubber sealing gasket between a connecting pipe member and a sliding seal surface of the main tube. The sliding seal surface and the gasket form a sliding liquid tight seal that can be rotated 360° to angularly align and connect the side tube with another pipe.

21 Claims, 10 Drawing Figures

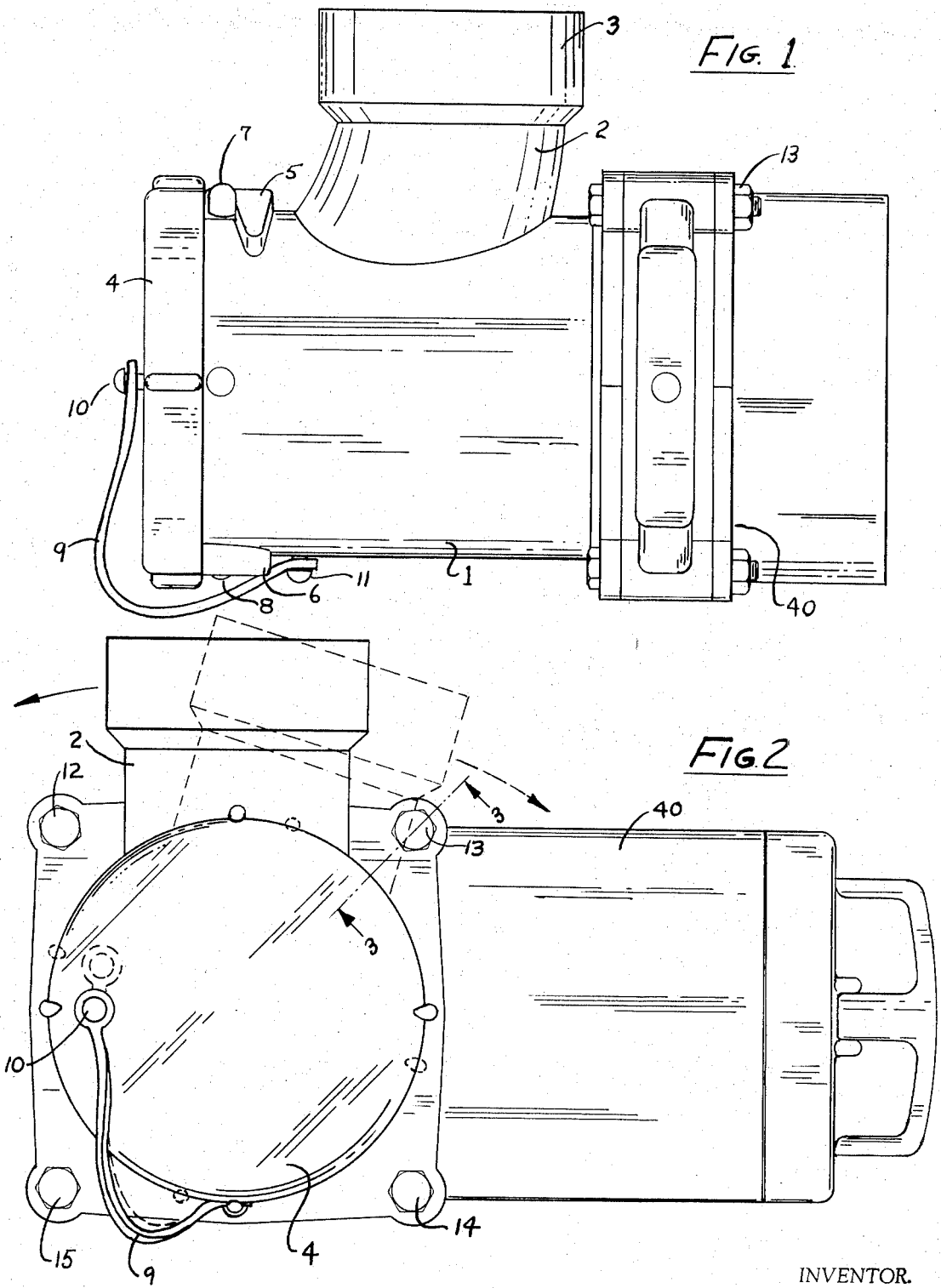

INVENTOR.
WILLIAM H. STEIN
BY
Larry N. Barger
ATTORNEY

INVENTOR.
WILLIAM H. STEIN
BY
Larry N. Barger
ATTORNEY

ROTATABLE PIPE COUPLING

BACKGROUND

In recent years the mobile home and recreation vehicle industries have become very large, and many of these homes and vehicles have plumbing facilities such as toilet, sink, shower, etc. The toilet discharges human waste which must be collected in a holding tank and carried with the vehicle until it can be emptied into an approved reservoir. The reason for the holding tank is to avoid the order and health problems of the human waste. Many gasoline filling stations have dumping reservoirs specifically for emptying these holding tanks.

Drain water from the sink and shower is not required to be kept in a holding tank. It is sometimes drained onto a lawn or down a street drain or directly onto the ground when vacationing in the woods. Since water from the sink and shower are handled differently from the toilet sewage, many mobile homes and recreation vehicles are equiped with a "sanitary tee" coupling. The "sanitary tee" has a main tube connected to a slide gate valve at an outlet of the holding tank. A branch or side tube enters the tee coupling downstream of the slide gate valve and this side tube is connected to the drain pipe from the sink, shower or other fixture that does not discharge human waste. With this arrangement the drain water can be drained out without opening the slide gate valve on the holding tank.

In the ast these "sanitary tee" couplings have had many problems. Perhaps one of the most serious problems was the tee coupling that did not fit properly when installed on a newly built mobile home or recreation vehicle. Some of the previous sanitary tee couplings had a series of fixed holes in an integral flange on the coupling. In theory, if the flange had eight equally spaced holes in its flange, the side tube could be positioned at 45° intervals depending on how the flange holes were mated with holes in a similar connecting flange. The side tube was then suppose to be properly aligned with a drain pipe from a shower or sink. In practice this alignment often did not occur. Adding to the problem was the lack of standardization of plumbing design of the many different manufacturers of mobile homes and recreation vehicles. Some manufacturers brought their pipes in nearly horizontal, others nearly vertical, and others at a multitude of angles. If the side tube of the sanitary tee did not fit the workers installing it would force it into sufficient alignment for connecting. This would put a tremendous strain on the coupling causing it to leak at its joints when the customer took the vehicle and used its various plumbing facilities.

SUMMARY OF THE INVENTION

I have overcome these disadvantages of previous sanitary tee couplings by providing a sanitary tee coupling that rotates through 360° to position the side tube at any desired angle. A thermoplastic spring collar snaps over a flange on a main tube of the coupling and urges a sliding seal surface of the coupling against a gasket so that the coupling can be rotated manually after the flange has been bolted in place. The main tube can have two or more side tubes if desired to create multiple tee couplings such as a "double sanitary tee." The coupling can also have two spring collars and provide a very useful "repair kit" that can be spliced into an existing thermoplastic pipe line.

THE DRAWINGS

FIG. 1 is a side view of the rotatable pipe coupling connected to a slide gate valve at its right end and having a removable cap on its left end;

FIG. 2 is a left end view of FIG. 1 showing how the main tube of the coupling rotates to angularly position the side tube;

DETAILED DESCRIPTION

Figure 3:
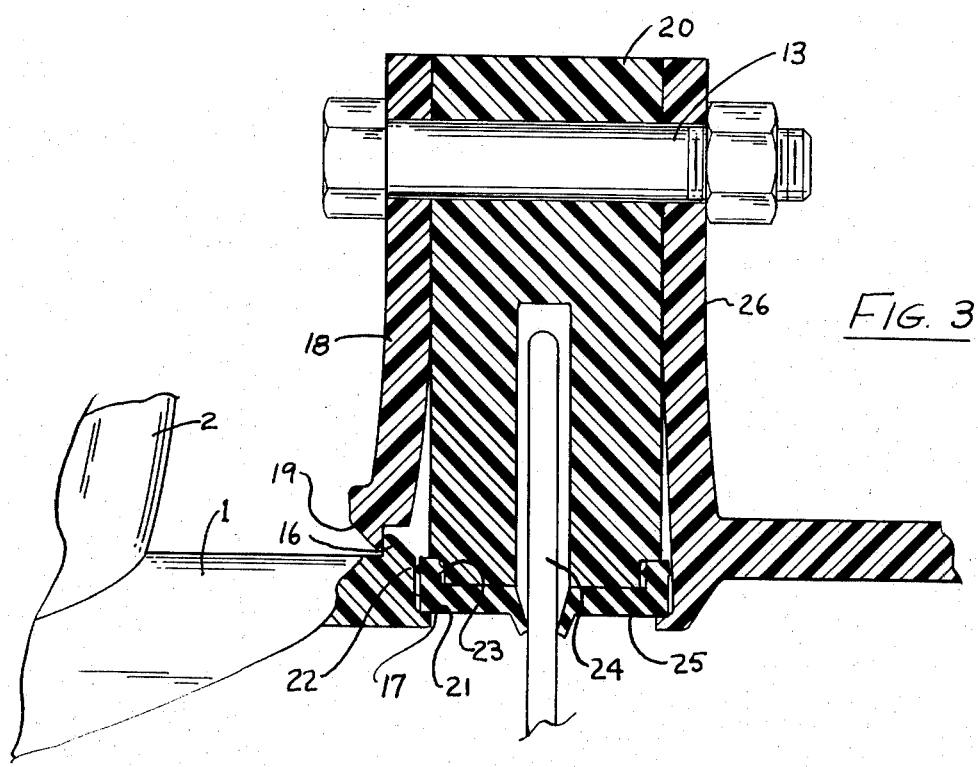
FIG. 3 is an enlarged sectional view taken along line 3—3 of FIG. 2.

Referring now in detail to the drawings, FIG. 1 shows the rotatable pipe coupling which includes a main tube 1 and a side tube 2 which are integrally molded as a unit from thermoplastic. The side tube has an outer sleeve section 3 adapted to be cemented or otherwise bonded to a connecting pipe wuch as a drain pipe from a shower or sink in a mobile home or recreation vehicle. At the left end of the main tube is a removable cap 4 which has a series of latches 5 and 6 that hook around and engage posts 7 and 8 on the main tube. To hold the cap near the coupling and not get lost when the cap is removed a flexible tie line 9 has ends that are connected to bottons 10 and 11 respectively.

The right end of the rotatable coupling is firmly bolted to a slide gate valve 40 by bolts 12, 13, 14, and 15 as shown. Even when firmly bolted in this manner, the main tube can be manually rotated to angularly position the side tube 2. This is perhaps best illustrated in FIG. 2 where the vertical side tube 2 is shown shifted to the right in the dotted line drawing.

In FIG. 3, an enlarged sectional view shows the integral retention flange 16 with a beveled outer surface and a sliding seal surface 17 that encircles the main tube—s longitudinal passage. A thermoplastic spring collar 18 in the form of a thin plate has a circular opening with a beveled inner surface 19. The collar is molded as a continuous uninterrupted annular outer portion surrounding this central opening. With this configuration, the spring collar can be snapped over the flange 16 from the right end of the main tube 1 before the coupling is connected to the slide gate valve. Once snapped over this flange the spring collar is permanently retained between the flange and the side tube 2. Because of the outward protuberance in the form of the side tube the collar 18 can not be telescoped over the left end of the main tube and positioned against flange 16.

As shown in FIG. 3 the bolt can be tightened firmly against body 20 of the valve and the thin spring collar has sufficient "give" so it urges the sliding seal surface 17 against a resilient rubber gasket 21 to form a sliding liquid tight seal with the gasket. Preferably the sliding surface on the main tube engages one of the ribs 22 and 23 on the gasket. These ribs have triangular cross sections and extend annularly about the main tube to reduce friction and make an improved seal at the main tube's sliding seal surface when the main tube is rotated. This sealing gasket also has an inner web portion that extends inwardly into a central passage of the sliding gate valve to form a seal with a sliding gate 24 of the valve. There is also a similar gasket 25 on the opposite side of the gate 24 which is clamped between the valve body 20 and adjacent pipe flange 26.

Figure 4:
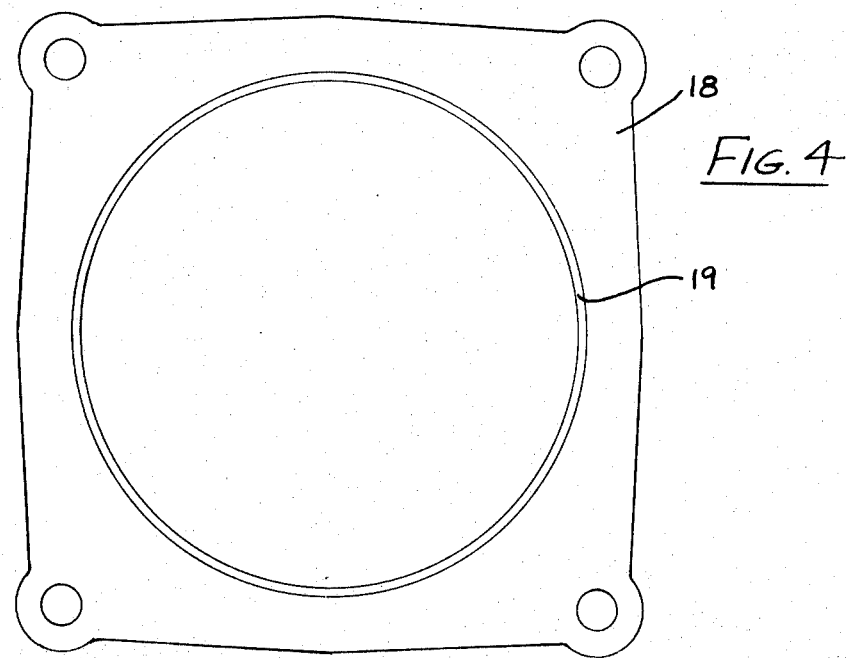
FIG. 4 is a front view of the thermoplastic collar that snaps over a flange of the main tube.

The spring collar 18 with its beveled surface is shown in FIG. 4 before it is snapped over the flange 16.

Figure 5:
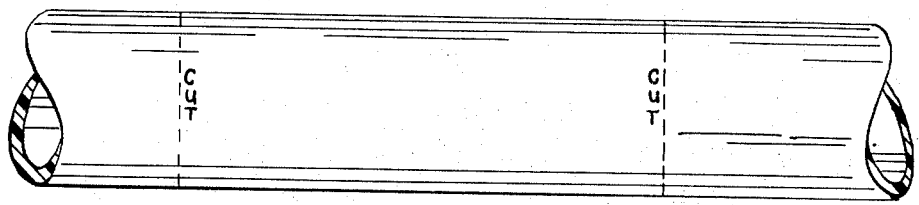
FIG. 5 is a side view of a thermoplastic pipe showing how it is cut to splice in a "repair kit" of a rotatable tee coupling.
Figure 6:
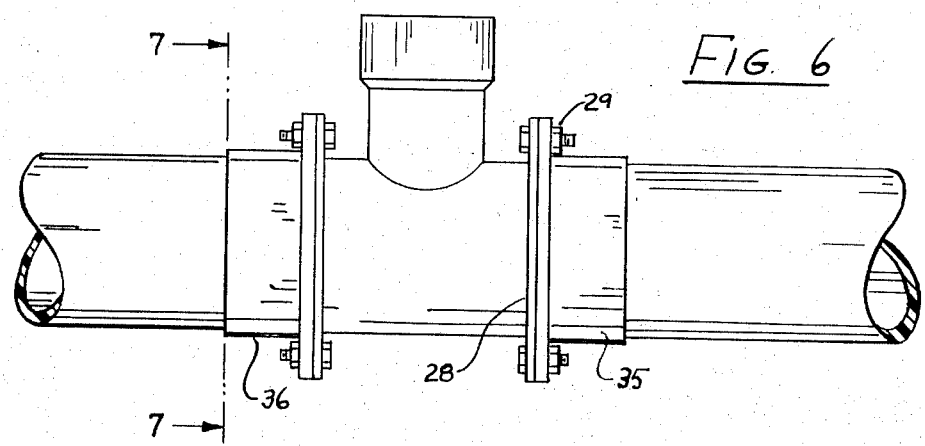
FIG. 6 shows the rotatable tee coupling assembled to the pipe of FIG. 5.
Figure 7:
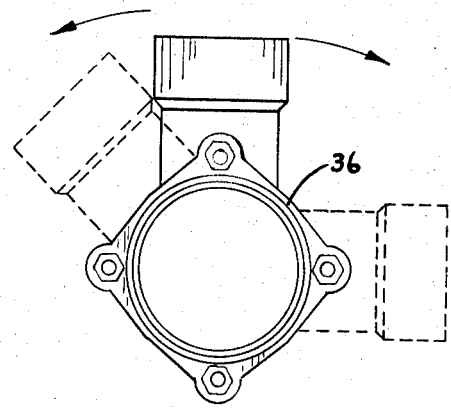
FIG. 7 is a view taken along line 7—7 of FIG. 6, showing how the pipe coupling rotates to position the side tube.
Figure 8:
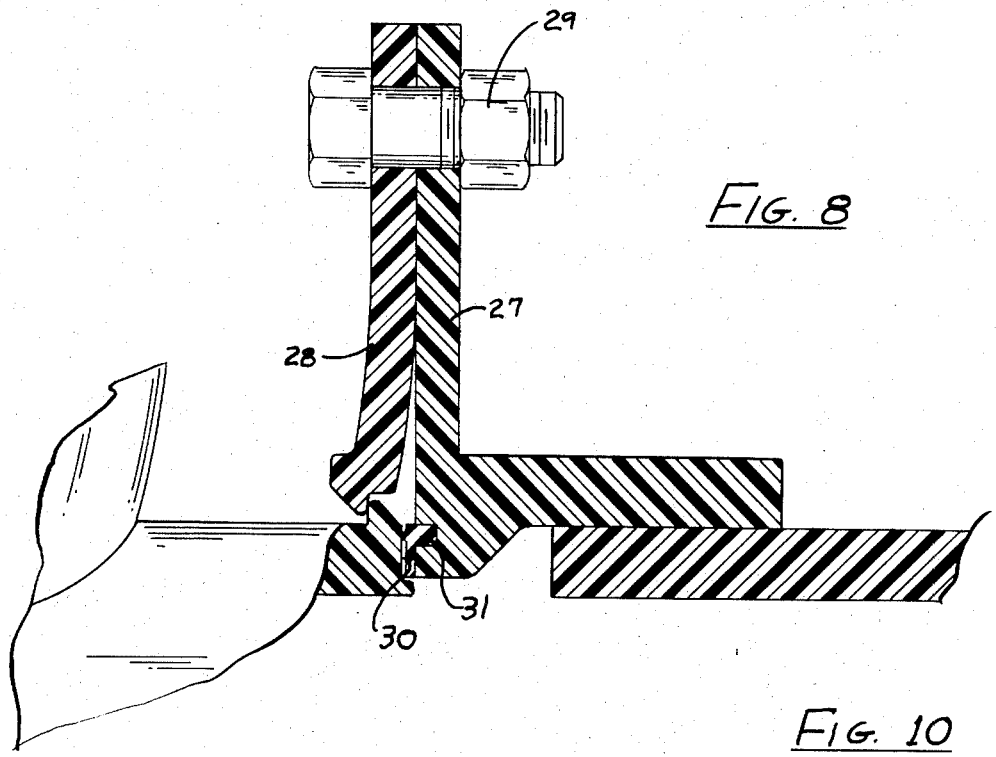
FIG. 8 is an enlarged sectional view of the right end portion of the rotatable coupling of FIG. 6.
Figure 9:
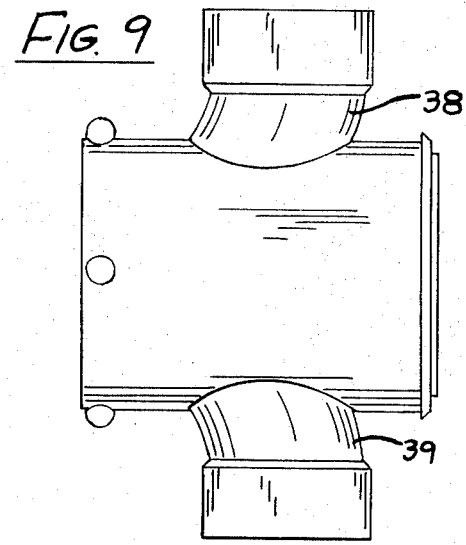
FIG. 9 is a side view of a "double tee" coupling.
Figure 10:
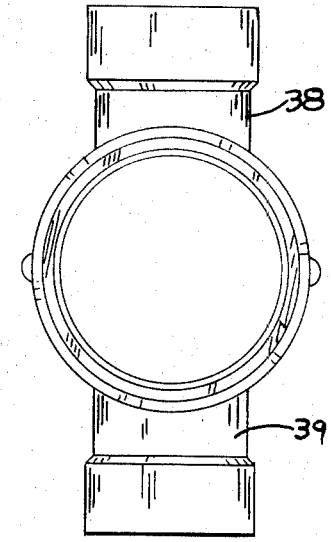
FIG. 10 is a right end view of the coupling of FIG. 9.

In the foregoing description I have described a "sanitary tee" coupling connected to a sliding gate valve and having an end cap. By including a flange and spring collar on the main tube on opposite sides of the side tube and the main tube provided with two sliding seal surfaces, the coupling becomes very useful as a "repair kit" for splicing a tee coupling into an existing uninterrupted thermoplastic pipe. This is done by first cutting out a section of the thermoplastic pipe along the cut lines as shown in FIG. 5. Next a flange structure, such as 35 and 36, is secured to each end of the exposed facing ends of the cut apart pipe. Then, as shown in FIG. 8, the spring collar 28 is tightly compressed against flange structure 27 by bolt 29. The "give" in the spring collar means urges the sliding seal surface 30 against gasket 31 to form a rotatable pipe coupling. This "repair kit" provides great flexibility in the thermoplastic plumbing field. Rather than pulling out all the old plumbing in a particular installation, a rotatable "tee" coupling can be simply spliced into the existing pipe line as explained above.

In the above descriptions in the specification I have refered to a side tube of the rotatable coupling. It is also contemplated that two side tubes 38 and 39 be used to form a "double sanitary tee." More side tubes could also be used if desired.

I have found that the rotatable pipe coupling of this invention works very well when the pipe, flange, and side tube are all integrally injection molded of acrylonitrile-butadiene-styrene, (ABS), thermoplastic as a one-piece unit. The spring collar is also injection molded of ABS as a one-piece unit. I discovered that this provides a rigid pipe coupling with sufficient "give" in the flange and the spring collar to permit the collar to be snapped over the flange. After the collar and main tube have been assembled the collar can be tightly squeezed against an adjacent flange and "give" sufficiently so that a sliding seal surface of the main tube can be mannually rotated to angularly position the side tube. Thereafter, the side tube is joined to a connecting pipe.

In the foregoing specification, I have used specific examples of my rotatable pipe coupling to describe my invention. However, it is understood that persons skilled in the art can make certain modifications to these examples without departing from the spirit and scope of the invention.

I claim:

1. A rotatable pipe coupling comprising: a tube with a longitudinal main passage and an annular sliding seal surface encircling the passage; an external flange and side protuberance on the tube, said side protuberance having a side passage therethrough communicating with the main passage of the tube; and an annular spring collar plate having an outer coupling-supporting portion for fixedly securing the coupling to a connecting structure, said spring collar plate fitting around the tube and having an annular inner portion permanently retained between the flange and protuberance, and having an annular intermediate portion that extends radially outwardly beyond the flange, the inner portion of said spring collar plate and tube having sufficient circumferential clearance therebetween to prevent circumferential seizing between the collar plate and tube, the inner and intermediate portions of said collar plate forming a unit with a flex section that is longer than it is thick in a direction extending outwardly from the tube and has sufficient inherent resilence to flex in a direction longitudinally along the tube to slidably engage said flange and to urge the sliding seal surface against a connecting structure to form a sliding joint whereby the tube can be manually rotated about an axis to angularly position the side passage of the tube's side protuberance.

2. The combination as set forth in claim 1, wherein the flange and side protuberance are integrally formed with the tube.

3. The combination as set forth in claim 2, wherein the tube, flange, and side protuberance form a one-piece molded thermoplastic unit.

4. The combination as set forth in claim 2, wherein the spring collar plate is a thin thermoplastic plate.

5. The combination as set forth in claim 4, wherein the thermoplastic plate is of acrylonitrile-butadiene-styrene, (ABS).

6. The combination as set forth in claim 2, wherein the spring collar plate is a one-piece thermoplastic plate with a circular passage and an annular homogeneous thermoplastic portion which extends uninterrupted around the opening.

7. The combination as set forth in claim 6, wherein the circular passage of the spring collar plate is substantially smaller than either the flange or side protuberance areas of the tube.

8. The combination as set forth in claim 7, wherein the annular portion of the collar plate has a beveled inner surface defining the circular passage of the spring collar plate, and the flange is integrally formed with the tube and has a beveled outer surface, whereby the spring collar plate can be snapped over the flange, so the tube permanently and rotatably retains a portion of the spring collar plate between the flange and side protuberance.

9. The combination as set forth in claim 8, wherein the tube, flange, and spring collar plate are of acrylonitrile-butadiene-styrene, (ABS).

10. The combination as set forth in claim 1, wherein the longitudinal main passage has opposite ends and said side passage of the side protuberance intersects the tube's main passage intermediate its opposite ends to form a rotatable "tee" pipe coupling.

11. The combination as set forth in claim 1, wherein the tube has two side protuberances, each of which have a passage intersecting the tube's passage to form a rotatable "double tee" pipe coupling.

12. The combination as set forth in claim 1, wherein the rotatable pipe coupling is connected to a slide gate valve at the sliding seal surface.

13. The combination as set forth in claim 1, wherein the sliding seal surface is adjacent one end of the tube, and there is a removable cap fitting over an opposite end of the tube.

14. The combination as set forth in claim 1, wherein there is a resilient gasket between the sliding seal surface and the connecting structure.

15. The combination as set forth in claim 14, wherein the gasket has a narrow upstanding bead which engages the tube's sliding seal surface.

16. The combination as set forth in claim 15, wherein the narrow annular bead has a generally triangular cross section.

17. The combination as set forth in claim 14, wherein the gasket is rubber.

18. The combination as set forth in claim 1, wherein the connecting structure has an external connecting flange and the spring collar plate is tightly compressed against the connecting flange by bolts or the like and the tube remains manually rotatable.

19. The combination as set forth in claim 1, wherein the tube has two sliding seal surfaces and two spaced apart flanges with the side protuberances located between these flanges and there is a spring collar plate fitting around the tube between each flange and the side protuberance, whereby the coupling can be spliced into a cut out area of pipe and the side protuberance rotated to a desired angular position.

20. A rotatable pipe coupling comprising: a thermoplastic main tube with a longitudinal passage and with an end sliding seal surface encircling this passage; an integral external thermoplastic flange adjacent the sliding seal surface, which flange has an outer beveled surface that slopes inwardly toward the sliding seal surface; a thermoplastic side tube integrally connected with the main tube forming a "tee"; a thin thermoplastic plate of acrylonitrile-butadiene-styrene (ABS) with an opening surrounded by a beveled inner surface smaller in diameter than the flange's external surface and fitting between the flange and side tube, said plate having sufficient "give" in a direction generally parallel to the tube's longitudinal passage to provide a liquid tight seal at the sliding seal surface; a connecting pipe structure with a flange, said plate being firmly compressed against this flange by bolts or the like; and a rubber sealing gasket between the connecting pipe structure and the sliding seal surface, which sliding seal surface slides against this gasket when the main tube is rotated to angularly position the side tube.

21. A rotatable pipe coupling comprising: a thermoplastic main tube with a longitudinal main passage and with an end sliding seal surface encircling this passage; an integral external thermoplastic flange adjacent the sliding seal surface, which flange has an outer beveled surface that slopes inwardly toward the sliding seal surface; a thermoplastic side tube integrally connected with the main tube and having a side passage communicating with the main passage; a thin thermoplastic plate with an opening surrounded by a beveled inner surface smaller in diameter than the flange's external surface and fitting between the flange and side tube, said plate having sufficient "give" in a direction generally parallel to the tube's longitudinal passage to slidably engage said flange, to urge the tube axially and to provide a liquid tight seal at the sliding seal surface; a connecting pipe structure with a flange, said plate being firmly compressed against this flange by bolts or the like; and a resilant sealing gasket between the connecting pipe structure and the sliding seal surface, which sliding seal surface slides against this gasket when the main tube is rotated to angularly position the side tube.

* * * * *